United States Patent
Dangwal et al.

(10) Patent No.: US 12,008,042 B2
(45) Date of Patent: Jun. 11, 2024

(54) SURFACING AUTOMATICALLY-SUGGESTED SEARCH QUERY RESULTS IN SEPARATE BROWSER TABS FOR IMPROVED MULTI-INTENT SEARCHING

(71) Applicant: Microsoft Technology Licensing, LLC, Redmond, WA (US)

(72) Inventors: Amit Dangwal, Hyderabad (IN); Saksham Saxena, Hyderabad (IN); Shveta Verma, Hyderabad (IN); Kishor Chamua, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 17/880,957

(22) Filed: Aug. 4, 2022

(65) Prior Publication Data
US 2024/0045908 A1    Feb. 8, 2024

(51) Int. Cl.
 *G06F 16/00*    (2019.01)
 *G06F 3/0483*   (2013.01)
 (Continued)

(52) U.S. Cl.
 CPC ...... *G06F 16/90328* (2019.01); *G06F 3/0483* (2013.01); *G06F 16/9538* (2019.01)

(58) Field of Classification Search
 CPC .......... G06F 16/90328; G06F 16/9538; G06F 3/0483
 See application file for complete search history.

(56) References Cited

U.S. PATENT DOCUMENTS 7,512,904 B2    3/2009   Matthews
7,603,349 B1*  10/2009   Kraft ................. G06F 16/24575
                                                    707/999.005
(Continued)

FOREIGN PATENT DOCUMENTS

AU    2017216516 A1    8/2017
CN      104462496 B    6/2018
KR    20150098096 A    8/2015

OTHER PUBLICATIONS

"Address bar autocomplete suggestions in Firefox", Retrieved from: https://web.archive.org/web/20220621121416/https://support.mozilla.org/en-US/kb/address-bar-autocomplete-firefox, Jun. 21, 2022, 8 Pages.

(Continued)

*Primary Examiner* — Jared M Bibbee
(74) *Attorney, Agent, or Firm* — Foley IP Law, PLLC (57) ABSTRACT

A method for multi-intent searching includes surfacing, via a web browser provided through a network, a search engine UI in a first browser tab, where the search engine UI includes a search box for specifying a search query. The method includes, responsive to user input, entering keystrokes into the search box, surfacing an autocomplete menu adjacent to the search box, and populating the autocomplete menu with suggested search queries related to the entered keystrokes. The method also includes surfacing a pop-out icon corresponding to each suggested search query within the autocomplete menu and, responsive to additional user input including a selection of the pop-out icon corresponding to one of the suggested search queries, launching a second browser tab including search results for the suggested search query, where the autocomplete menu with the suggested search queries is maintained within the first browser tab after the launching of the second browser tab.

18 Claims, 8 Drawing Sheets

(51) Int. Cl.
   *G06F 16/9032* (2019.01)
   *G06F 16/9538* (2019.01)

(56) References Cited

U.S. PATENT DOCUMENTS

| | | | | |
|---|---|---|---|---|
| 7,747,626 | B2* | 6/2010 | Grimm | G06F 16/338 |
| | | | | 707/712 |
| 8,751,466 | B1* | 6/2014 | Tsay | G06F 16/951 |
| | | | | 707/700 |
| 9,529,936 | B1 | 12/2016 | Pankaj et al. | |
| 9,875,284 | B1 | 1/2018 | Amacker | |
| 2011/0072033 | A1* | 3/2011 | White | G06F 16/3322 |
| | | | | 715/846 |
| 2014/0012839 | A1* | 1/2014 | Wu | G06F 16/9535 |
| | | | | 707/722 |
| 2014/0114964 | A1* | 4/2014 | Dong | G06Q 10/08 |
| | | | | 707/723 |
| 2014/0229477 | A1* | 8/2014 | Costello | G06F 16/9535 |
| | | | | 707/731 |
| 2017/0024424 | A1* | 1/2017 | Almohizea | G06F 16/2246 |
| 2023/0117568 | A1* | 4/2023 | Prasad | G06F 16/9532 |
| | | | | 707/706 |

OTHER PUBLICATIONS

"Wikipedia search engine autosuggestions", Retrieved from: https://en.wikipedia.org/wiki/Main_Page, Retrieved date: Jun. 23, 2022, 4 Pages.

Gilev, Alex, "Search autocomplete component—SaaS Web App", Retrieved from: https://dribbble.com/shots/15684760-Search-autocomplete-component-SaaS-Web-App, Retrieved Date: Jun. 23, 2022, 6 pages.

Sullivan, Danny, "How Google autocomplete works in Search", Retrieved from: https://blog.google/products/search/how-google-autocomplete-works-search/, Apr. 20, 2018, 12 Pages.

* cited by examiner

SURFACING AUTOMATICALLY-SUGGESTED SEARCH QUERY RESULTS IN SEPARATE BROWSER TABS FOR IMPROVED MULTI-INTENT SEARCHING

BACKGROUND

The present disclosure relates to search engines. In particular, the present disclosure relates to surfacing automatically-suggested search query results in separate browser tabs for improved multi-intent searching with respect to a search engine.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for multi-intent searching is described. The method is implemented in a computing system including a processor. The method includes executing, via a network, a web browser, where the web browser is surfaced on a display of the computing system, as well as surfacing, via the web browser, a search engine user interface (UI) in a first browser tab, where the search engine UI includes a search box for specifying a search query. The method also includes, responsive to first user input, entering keystrokes into the search box, as well as surfacing an autocomplete menu adjacent to the search box. The method further includes populating the autocomplete menu with suggested search queries related to the entered keystrokes, surfacing a pop-out icon corresponding to each suggested search query within the autocomplete menu, and responsive to second user input including a selection of the pop-out icon corresponding to one of the suggested search queries, launching a second browser tab including search results for the suggested search query. Moreover, according to the method, the autocomplete menu with the suggested search queries is maintained within the first browser tab after the launching of the second browser tab.

In another embodiment, a search engine server is described. The search engine server includes a processor, a communication connection for connecting a remote computing system to the server via a network, and a computer-readable storage medium operatively coupled to the processor. The computer-readable storage medium includes computer-executable instructions that, when executed by the processor, cause the processor to surface, via a web browser provided through the network, a search engine UI in a first browser tab, where the search engine UI includes a search box for specifying a search query, and where the search engine UI is surfaced on a display of the remote computing system. The computer-readable storage medium also includes computer-executable instructions that, when executed by the processor, cause the processor to, responsive to first user input received via the remote computing system, enter keystrokes into the search box, as well as to surface, via the display of the remote computing system, an autocomplete menu adjacent to the search box. The computer-readable storage medium also includes computer-executable instructions that, when executed by the processor, cause the processor to populate the autocomplete menu with suggested search queries related to the entered keystrokes, to surface, via the display of the remote computing system, a pop-out icon corresponding to each suggested search query within the autocomplete menu, and responsive to second user input including a selection of the pop-out icon corresponding to one of the suggested search queries, to launch a second browser tab including search results for the suggested search query, where the second browser tab is launched on the display of the remote computing system. Furthermore, the autocomplete menu with the suggested search queries is maintained within the first browser tab after the launching of the second browser tab.

In another embodiment, a computer-readable storage medium is described. The computer-readable storage medium includes computer-executable instructions that, when executed by a processor, cause the processor to surface, via a web browser provided through the network, a search engine UI in a first browser tab, where the search engine UI includes a search box for specifying a search query, and where the search engine UI is surfaced on a display of the remote computing system. The computer-executable instructions, when executed by the processor, also cause the processor to, responsive to first user input received via the remote computing system, enter keystrokes into the search box, as well as to surface, via the display of the remote computing system, an autocomplete menu adjacent to the search box. The computer-executable instructions, when executed by the processor, also cause the processor to populate the autocomplete menu with suggested search queries related to the entered keystrokes, to surface, via the display of the remote computing system, a pop-out icon corresponding to each suggested search query within the autocomplete menu, and responsive to second user input including a selection of the pop-out icon corresponding to one of the suggested search queries, to launch a second browser tab comprising search results for the suggested search query, where the second browser tab is launched on the display of the remote computing system. Moreover, the autocomplete menu with the suggested search queries is maintained within the first browser tab after the launching of the second browser tab.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

As a preliminary matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

The term "search engine," as used herein, refers to any suitable type of query system that provides search-related functionality. As a non-limiting example, the search engine described herein may include (but is not limited to) the web search engine Microsoft® Bing®, which is provided by Microsoft Corporation of Redmond, Washington.

Internet searching has become ubiquitous in recent years, with users becoming increasingly accustomed to performing search queries for a wide range of information by simply typing keywords into a search box of a search engine. Indeed, in most circumstances, typing keywords into a search engine is faster than navigating directly to a desired web page or navigating to a website and performing a search query on the website itself.

As the number of web pages and domains continues to grow, search engines are correspondingly expanded to accommodate the vast number of different search queries that are performed. For example, search engines are now typically equipped with an autocomplete functionality that improves the accuracy of search queries by monitoring the keystrokes input by the user and automatically suggesting related keywords for completing the search query. In particular, this autocomplete functionality is typically provided in the form of a drop-down autocomplete menu corresponding to the search box of the search engine. As the user enters keystrokes that form a partial search query, the search engine provides a list of suggested keyword strings for completing the search query. When the user sees a suggested keyword string that matches the user's intended search query, the user then selects the suggested keyword string from the autocomplete menu. At this point, the search engine returns a list of search results corresponding to the search query to aid the user in completing the desired search.

Despite the constant advancement of search engine technology, there is still room for significant improvement. In particular, in today's technologically-oriented environment, the complexity of search-related tasks continuously increases. As a result, many users need to perform multi-intent search-related tasks. This may involve inputting multiple related search queries using various keywords to return multiple lists of search results. This is common, for example, when a user does not have a precise search query in mind but is instead open to exploring multiple related search queries. However, according to conventional search engines, once the user selects a suggested keyword string from the autocomplete menu, the search engine navigates away from the autocomplete functionality and simply returns the search results corresponding to the search query. This may be very inconvenient for the user, since many users desire to select multiple suggested keyword strings from the autocomplete menu to explore multiple search queries related to the user's desired search-related task. As a result, if the user desires to perform a multi-intent search including multiple lists of search results based on varying search queries, the user must manually open a new browser tab and then reenter the keystrokes into the search box of the search engine before selecting a second suggested keyword string from the autocomplete menu.

Therefore, the present techniques address these and other issues by providing for the surfacing of automatically-suggested search query results in separate browser tabs for improved multi-intent searching with respect to a search engine. More specifically, according to the present techniques, each keyword string within the autocomplete menu is surfaced with a corresponding pop-out icon. Moreover, when the user clicks on a particular pop-out icon, the search engine directs the web browser to open a separate browser tab including the search results for the corresponding search query. In this manner, the search engine is configured to initiate multiple simultaneous search queries based on a single instance of the autocomplete menu, as well as to automatically provide the corresponding search results for each search query in a separate browser tab. This, in turn, enables the user to easily and efficiently perform multiple related search queries by clicking on multiple corresponding pop-out icons within the autocomplete menu, without having to open a new browser tab with a separate instance of the search engine and then retype the same keystrokes each time.

Furthermore, in some embodiments, the present techniques also provide for the surfacing of an expanded autocomplete menu for the search engine. Such expanded autocomplete menu may include an exhaustive list of suggested search queries provided in multiple different formats. As an example, in addition to keyword strings, the autocomplete menu may provide autocomplete suggestions in the form of, for example, suggested clickable image elements, suggested clickable buttons, and/or suggested frequently-asked questions related to the keystrokes input by the user. Moreover, in some embodiments, the expanded autocomplete menu described herein may surface such autocomplete suggestions as a complex structure of separate rows and/or columns of autocomplete UI elements, organized in a manner that is designed to aid the user with refining the corresponding search query. Furthermore, in such embodiments, any number of the autocomplete UI elements may include the pop-out icon described herein, which enables the user to easily and efficiently perform multi-intent searching based on a single instance of the autocomplete menu.

Figure 1A:
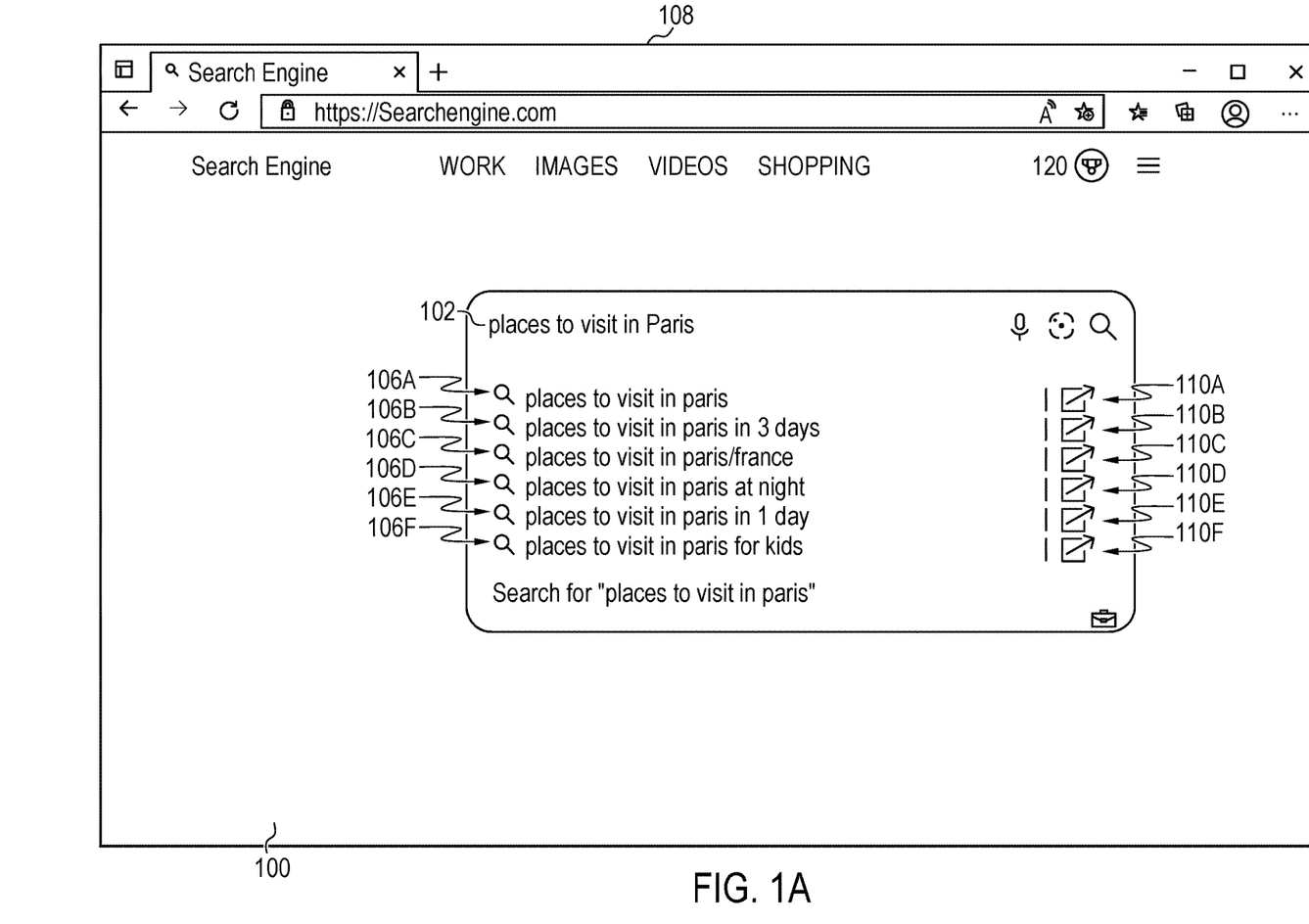
FIG. 1A is a schematic view of an exemplary implementation of the present techniques, in which a search engine user interface (UI) enables a user to enter keystrokes for a partial search query into a search box, and the search engine UI surfaces an autocomplete menu displaying multiple suggested keyword strings for completing the search query.

FIG. 1A is a schematic view of an exemplary implementation of the present techniques, in which a web-based search engine user interface (UI) 100 enables a user to enter keystrokes for a partial search query into a search box 102, and the search engine UI 100 surfaces an autocomplete menu 104 displaying multiple suggested keyword strings 106 for completing the search query. According to the embodiment shown in FIG. 1A, the search engine UI 100 is provided via a web browser 108. However, those skilled in the art will appreciate that the search engine UI may be provided in any other suitable form.

According to embodiment shown in FIG. 1A, the user enters the keystrokes "places to visit in Paris" in the search box 102 of the search engine UI 104, and the drop-down autocomplete menu 104 (which is provided immediately below the search box 102 according to the embodiment of FIG. 1A) then provides the list of suggested keyword strings 106A-F for completing the user's search query. According to the present techniques, a pop-out icon 110A-F is also provided next to each suggested keyword string. As described further with respect to FIGS. 1B and 10, the search engine is configured to open a separate browser tab including the search results corresponding to a suggested keyword string responsive to the user clicking on a corresponding pop-out icon.

Figure 1B:
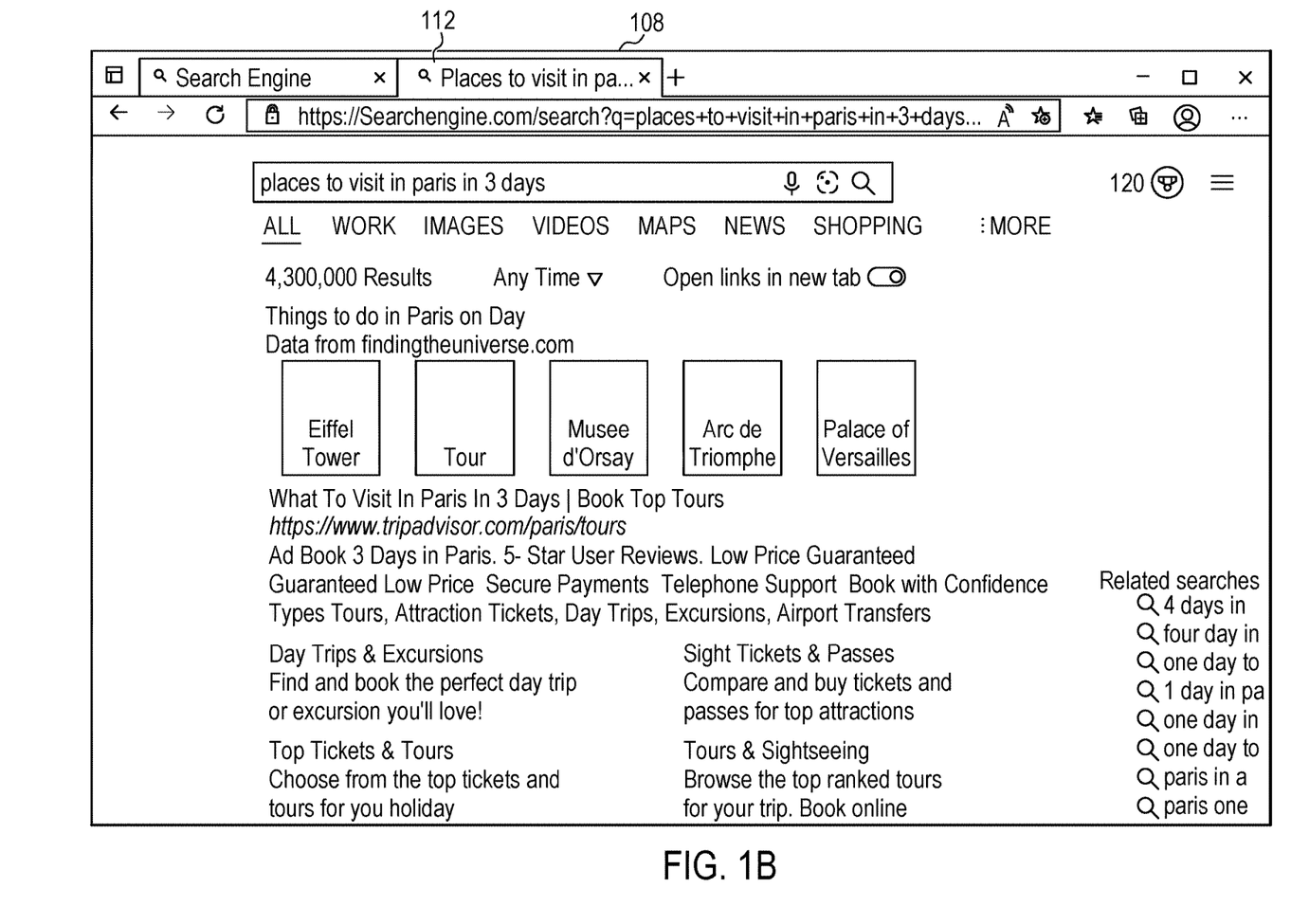
FIG. 1B is a schematic view of the exemplary implementation of FIG. 1B, in which the web browser automatically opens a second browser tab surfacing search query results responsive to the user clicking on the pop-out icon corresponding to one of the suggested keyword strings in the autocomplete menu of FIG. 1A.
Figure 1C:
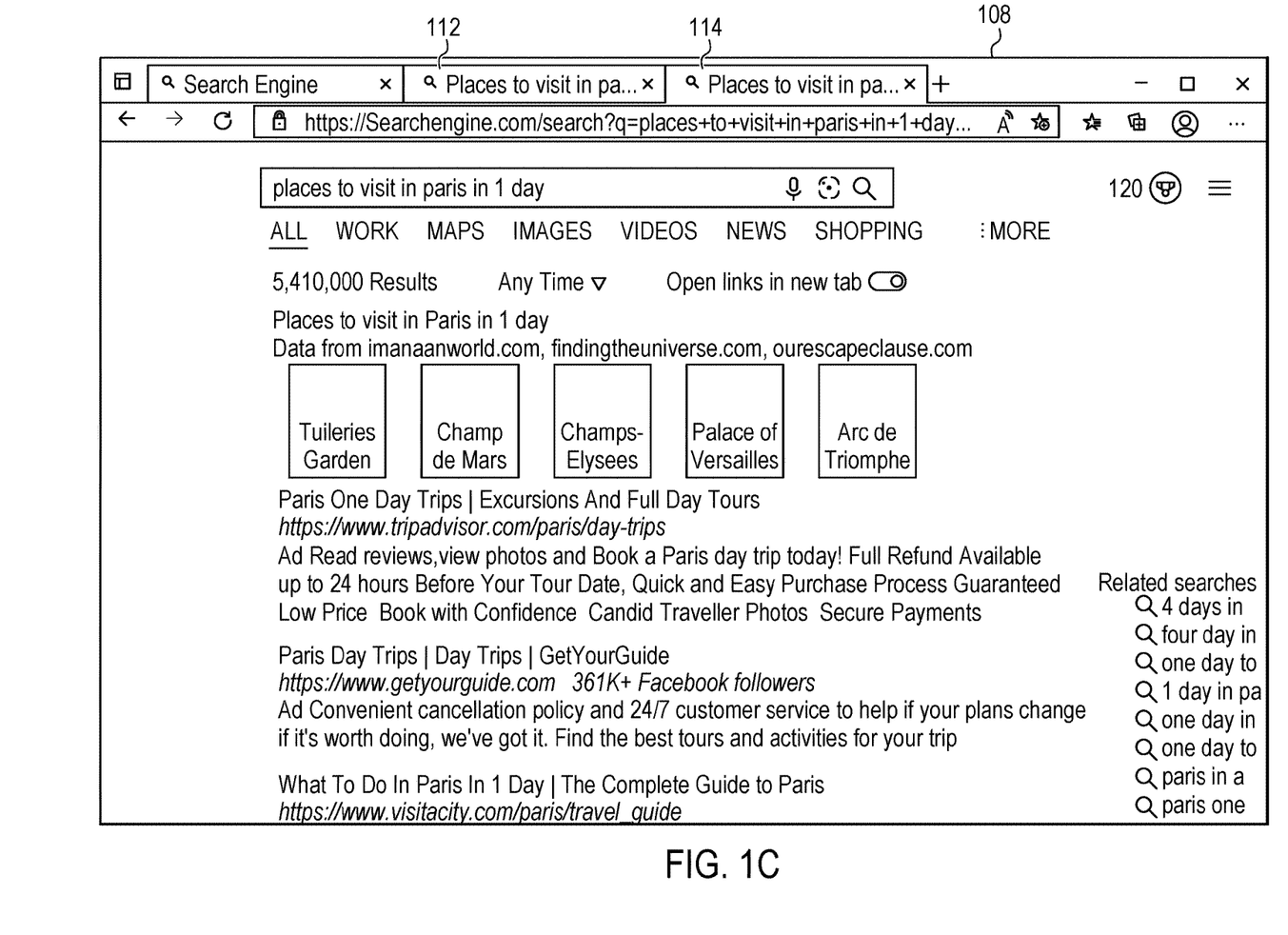
FIG. 1C is another schematic view of the exemplary implementation of FIGS. 1A and 1B, in which the web browser automatically opens a third browser tab surfacing additional search query results responsive to the user clicking on another pop-out icon corresponding to another one of the suggested keyword strings in the autocomplete menu of FIG. 1A.

FIG. 1B is a schematic view of the exemplary implementation of FIG. 1B, in which the web browser 108, in conjunction with the search engine, automatically opens a second browser tab 112 surfacing search query results responsive to the user clicking on the pop-out icon corresponding to one of the suggested keyword strings in the autocomplete menu 104 of FIG. 1A. In particular, according to the embodiment shown in FIG. 1B, search results for the search query "places to visit in Paris in 3 days" are surfaced in the second browser tab 112, where such second browser tab 112 is launched responsive to the user clicking on the pop-out icon 110B corresponding to the second suggested keyword string 106B (i.e., "places to visit in Paris in 3 days") in the autocomplete menu 104 of FIG. 1A.

FIG. 1C is another schematic view of the exemplary implementation of FIGS. 1A and 1B, in which the web browser 108 automatically opens a third browser tab 114 surfacing additional search query results responsive to the user clicking on another pop-out icon corresponding to another one of the suggested keyword strings in the autocomplete menu 104 of FIG. 1A. Specifically, according to the embodiment shown in FIG. 1C, search results for the search query "places to visit in Paris in 1 day" are surfaced in the third browser tab 114, where such third browser tab 114 is launched responsive to the user clicking on the pop-out icon 110E corresponding to the fifth suggested keyword string 106E (i.e., "places to visit in Paris in 1 day" in the autocomplete menu 104 of FIG. 1A.

Figure 1D:
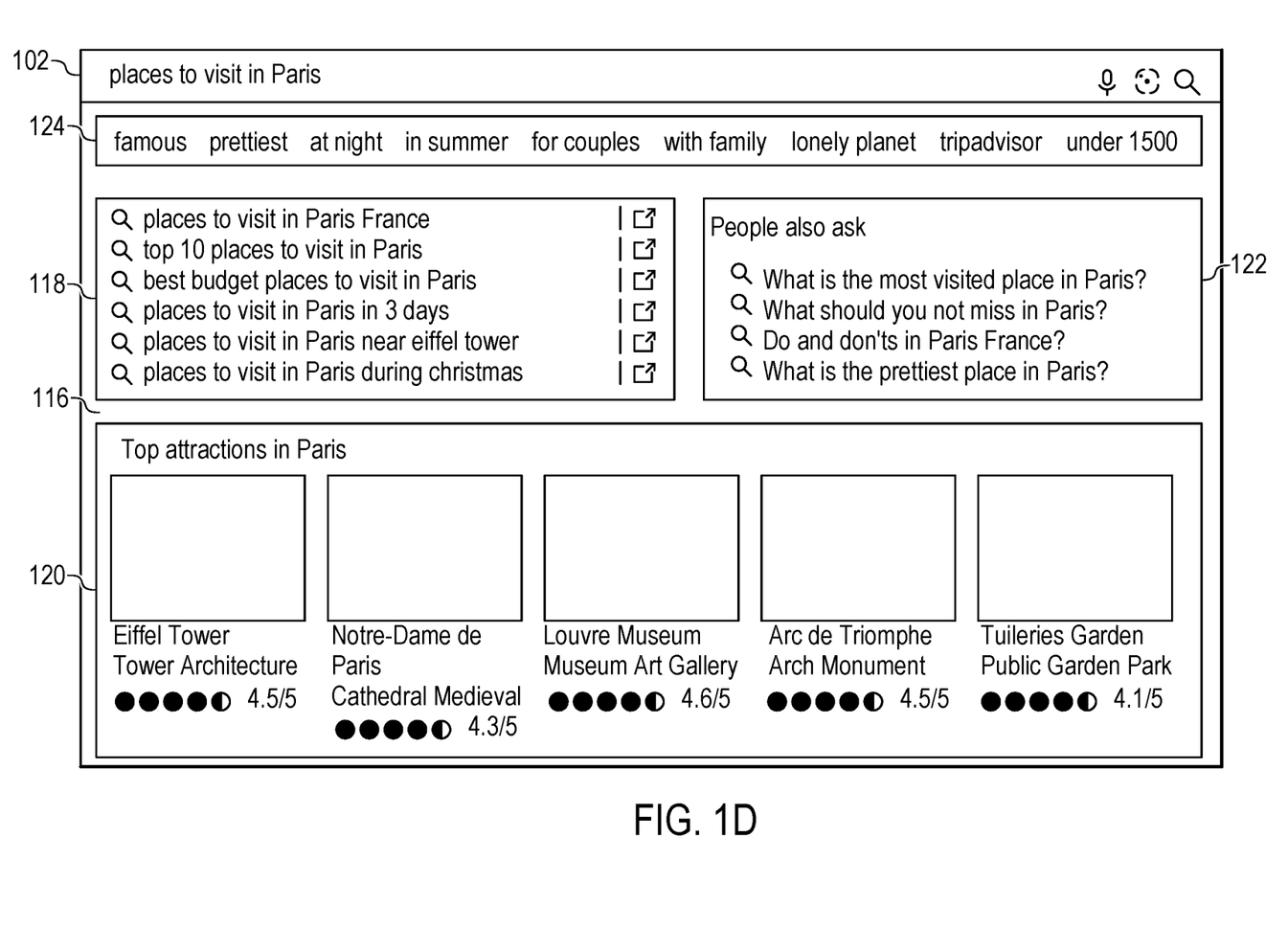
FIG. 1D is an alternative embodiment of the exemplary implementation of FIGS. 1A-C, in which the search engine UI surfaces an expanded autocomplete menu including an exhaustive list of suggested search queries provided in multiple different formats.

FIG. 1D is an alternative embodiment of the exemplary implementation of FIGS. 1A-C, in which the autocomplete menu 104 of FIG. 1A is replaced by an expanded autocomplete menu 116 including an exhaustive list of suggested search queries provided in multiple different formats. In particular, according to the alternative embodiment of FIG. 1D, the expanded autocomplete menu 116 includes multiple different types of autocomplete suggestions, including a list 118 of suggested keyword strings with associated pop-out icons, a list 120 of suggested clickable image elements (optionally with an embedded pop-out functionality), a list 122 of suggested frequently-asked questions related to the keystrokes input by the user (optionally with associated pop-out icons or an embedded pop-out functionality), and/or a list 124 of clickable single-keyword buttons relates to the keystrokes input by the user (optionally with an embedded pop-out functionality). Moreover, those skilled in the art will appreciate that the expanded autocomplete menu 116 may further include any other types of autocomplete UI elements, arranged in any suitable form (such as in additional columns and/or rows, for example).

Those skilled in the art will appreciate that the exemplary implementation shown in FIGS. 1A-D is for illustrative purposes only, and the exact implementation of the multi-intent search techniques described herein may vary depending on the details of the particular implementation.

Figure 2:
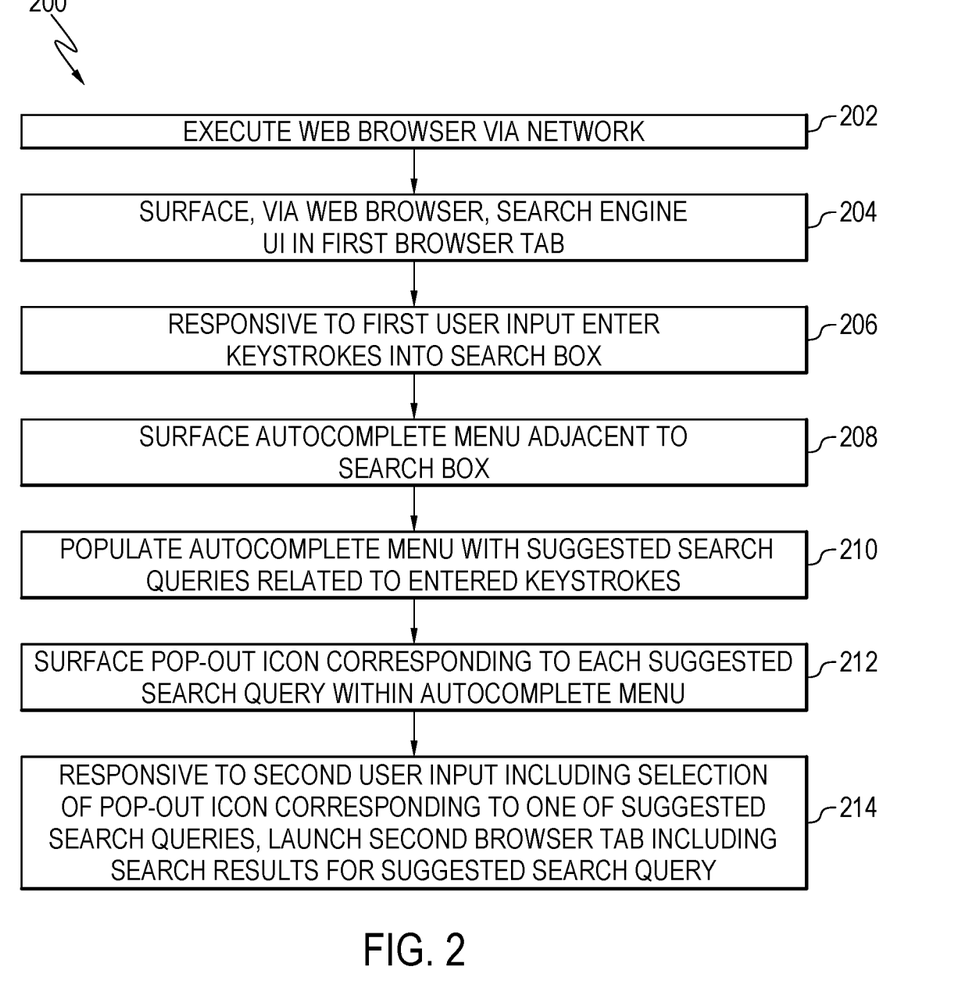
FIG. 2 is a process flow diagram of an exemplary method for multi-intent searching according to embodiments described herein.

FIG. 2 is a process flow diagram of a method 200 for multi-intent searching according to embodiments described herein. The method 200 is executed via one or more computing systems, such as the exemplary computing system(s) and/or the search engine server(s) described with respect to FIG. 3 and/or FIG. 4. The computing system(s) include one or more processors and one or more computer-readable storage media including computer-executable instructions that, when executed by the processor(s), cause the processor(s) to perform the blocks of the method 200. An exemplary embodiment of such computer-readable storage media is described with respect to FIG. 5. Moreover, in various embodiments, the method 200 is executed within the context of a network environment including one or more client computing systems and one or more search engine servers, as described further with respect to the exemplary network environment of FIG. 4. Moreover, in various embodiments, the method 200 is performed via a web-based search engine application or a mobile search engine application executing on the computing system that is executing the method 200.

The method 200 begins block 202, at which a web browser is executed via a network and is surfaced on a display of the computing system. At block 204, a search engine UI is surfaced in a first browser tab via the web browser, where the search engine UI includes a search box for specifying a search query.

At block 206, keystrokes are entered into the search box responsive to first user input. At block 208, an autocomplete menu is surfaced adjacent to the search box. At block 210, the autocomplete menu is populated with suggested search queries related to the entered keystrokes. In some embodiments, the suggested search queries are provided as a list of suggested keyword strings. In other embodiments, the suggested search queries are provided as a number of different types of autocomplete UI elements, where at least a portion of the autocomplete UI elements include corresponding pop-out icons (and/or other pop-out functionality). In such embodiments, the autocomplete menu may be surfaced in an expanded format including multiple columns and/or multiple rows including the different types of autocomplete UI elements. Moreover, in such embodiments, the different types of autocomplete UI elements may include (but are not limited to) suggested keyword strings, suggested clickable image elements, suggested frequently-asked questions, and/or suggested clickable buttons.

At block 212, a pop-out icon corresponding to each suggested search query is surfaced within the autocomplete menu. However, in some embodiments, a portion of the suggested search queries are provided with an embedded pop-out functionality rather than a corresponding pop-out icon.

At block 214, responsive to second user input including a selection of the pop-out icon corresponding to one of the suggested search queries, a second browser tab is launched, where the second browser tab includes search results for the selected suggested search query. Moreover, according to the method 200, the autocomplete menu with the list of suggested search queries is maintained within the first browser tab after the launching of the second browser tab, thus enabling the user to select additional suggested search queries to launch in additional browser tabs. To that end, the method 200 may also include, responsive to third user input including a selection of another pop-out icon corresponding to another one of the suggested search queries, launching a third browser tab including search results for the other suggested search queries, where the autocomplete menu with the suggested search queries is maintained within the first browser tab and the search results for the first selected search query are maintained in the second browser tab after the launching of the third browser tab. In this manner, the user is able to easily and efficiently perform complex, multi-intent search tasks without having to manually reenter the keystrokes into the search box each time a new search query is performed.

The block diagram of FIG. 2 is not intended to indicate that the blocks of the method 200 are to be executed in any particular order, or that all of the blocks of the method 200 are to be included in every case. Moreover, any number of additional blocks may be included within the method 200, depending on the details of the specific implementation.

Figure 3:
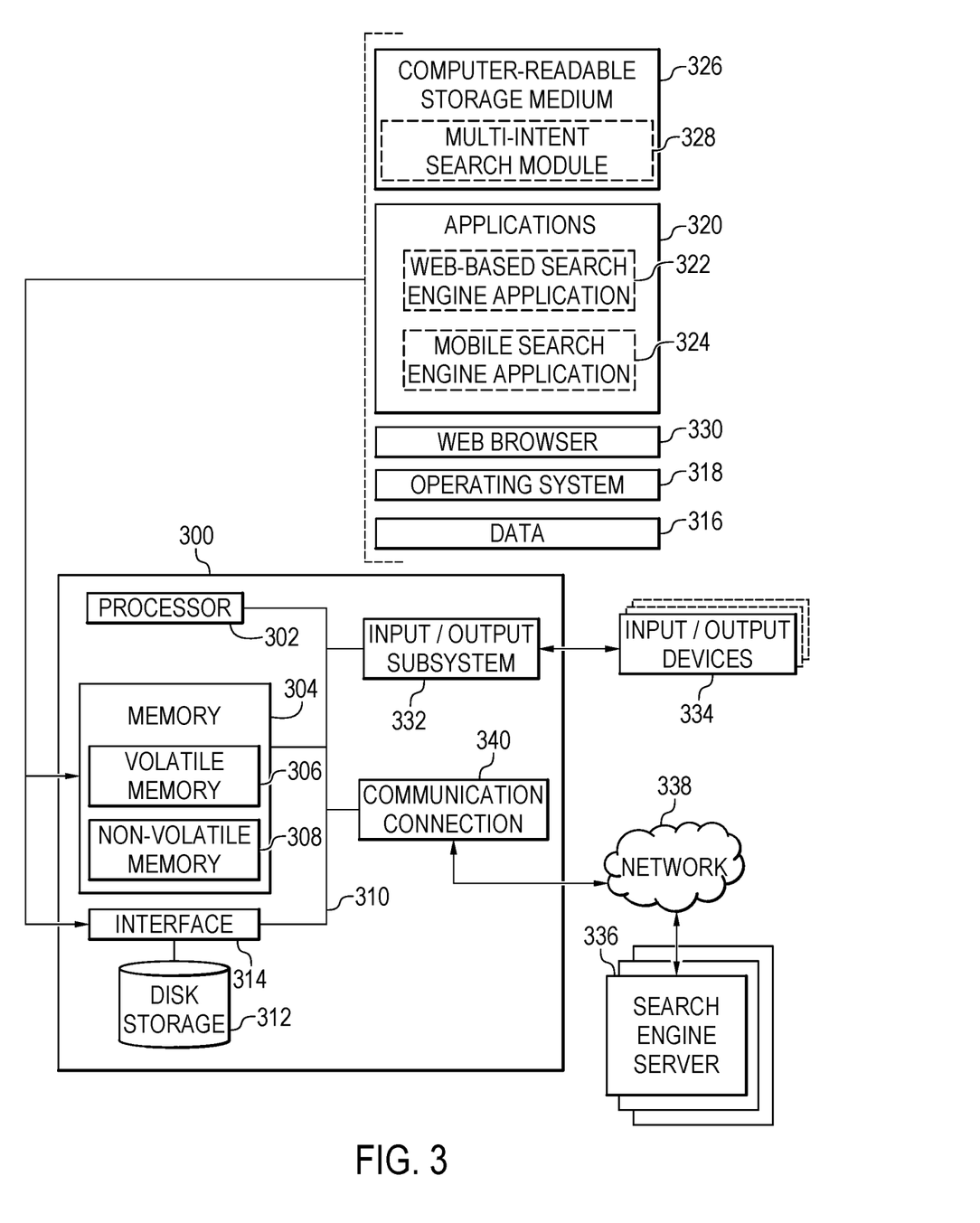
FIG. 3 is a block diagram of an exemplary computing system for implementing the multi-intent search techniques described herein.

FIG. 3 is a block diagram of an exemplary computing system 300 for implementing the multi-intent search techniques described herein. In various embodiments, the computing system 300 is a client computing system that is communicably couped to one or more search engine servers for performing the multi-intent search techniques described herein.

The exemplary computing system 300 includes a processor 302 and a memory 304. The processor 302 may include any suitable type of processing unit or device, such as, for example, a single-core processor, a multi-core processor, a computing cluster, or any number of other configurations. Moreover, the processor 302 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 304 typically (but not always) includes both volatile memory 306 and non-volatile memory 308. The volatile memory 306 retains or stores information so long as the memory is supplied with power. By contrast, the non-volatile memory 308 is capable of storing (or persisting) information even when a power supply is not available. The volatile memory 306 may include, for example, RAM (e.g., synchronous RAM (SRAM), dynamic RAM (DRAM), synchronous dynamic RAM (SDRAM), and the like) and CPU cache memory. The nonvolatile memory 308 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 302 and the memory 304, as well as other components of the computing system 300, are interconnected by way of a system bus 310. The system bus 310 can be implemented using any suitable bus architecture known to those skilled in the art.

According to the embodiment shown in FIG. 3, the computing system 300 also includes a disk storage 312. The disk storage 312 may include any suitable removable/non-removable, volatile/non-volatile storage component or device. For example, the disk storage 312 may include, but is not limited to, a magnetic disk drive, floppy disk drive, tape drive, Jaz drive, Zip drive, LS-210 drive, flash memory card, memory stick, or the like. In addition, the disk storage 312 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 312 to the system bus 310, a removable or non-removable interface is typically used, such as interface 314 shown in FIG. 3.

In various embodiments, the disk storage 312 and/or the memory 304 function as one or more databases that are used to store data 316 relating to the techniques described herein. Moreover, those skilled in the art will appreciate that FIG. 3 describes software that acts as an intermediary between a user of the computing system 300 and the basic computing resources described with respect to the operating environment of the computing system 300. Such software includes an operating system 318. The operating system 318, which may be stored on the disk storage 312, acts to control and allocate the computing resources of the computing system 300. Moreover, applications 320, such as a web-based search engine application 322 and/or a mobile search engine application 324, take advantage of the management of the computing resources by the operating system 318 through one or more program modules stored within a computer-readable storage medium (or media) 326, as described further herein. In some embodiments, the computer-readable storage medium 326 includes a multi-intent search module 328 that includes computer-executable instructions for performing the techniques described herein during the execution of the web-based search engine application 322 and/or the mobile search engine application 324. Moreover, in various embodiments a web browser 330 is used to facilitate the execution of the multi-intent search module 328.

The computing system 300 also includes an input/output (I/O) subsystem 332. The I/O subsystem 332 includes a set of hardware, software, and/or firmware components that enable or facilitate inter-communication between the user of the computing system 300 and the processor 302 of the computing system 300. During operation of the computing system 300, the I/O subsystem 332 enables the user to interact with the computing system 300 through one or more I/O devices 334. Such I/O devices 334 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 302 through the system bus 310 via one or more interface ports (not shown) integrated within the I/O subsystem 332. Such interface ports may include, for example, a serial port, a parallel port, a game port, and/or a universal serial bus (USB).

In addition, such I/O devices 334 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 300 and to output information from the computing system 300 to a corresponding output device. Moreover, in some embodiments, the one or more output devices or channels are accessible via one or more adapters (not shown) integrated within the I/O subsystem 332.

In various embodiments, the computing system 300 is communicably coupled to one or more remote search engine servers 336. In such embodiments, the search engine server(s) 336 host the web-based search engine application 322 and/or the mobile search engine application 324 in a networked environment, thus providing for the execution of the web-based search engine application 322 and/or the mobile search engine application 324 on the computing system 300 with the enhanced functionality provided by the multi-intent search techniques described herein.

In various embodiments, the remote search engine server(s) 336 are logically connected to the computing system 300 through a network 338 and then connected via a communication connection 340, which may be wireless. The network 338 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 340 includes the hardware/software employed to connect the network 338 to the bus 310. While the communication connection 340 is shown for illustrative clarity as residing inside the computing system 300, it can also be external to the computing system 300. The hardware/software for connection to the network 338 may include, for example, internal and external technologies, such as mobile phone switches, modems including regular telephone grade modems, cable modems and DSL modems, ISDN adapters, and/or Ethernet cards.

As described above, system applications 320 take advantage of the management of the computing resources by the operating system 318 through one or more program modules stored within the computer-readable storage medium (or media) 326. In some embodiments, the computer-readable storage medium 326 is integral to the computing system 300, in which case it may form part of the memory 304 and/or the disk storage 312. In other embodiments, the computer-readable storage medium 326 is an external device that is connected to the computing system 300 when in use. Moreover, in other embodiments, the computer-readable storage medium 326 is stored remotely on the search engine server(s) 336.

In various embodiments, the one or more program modules stored within the computer-readable storage medium 326 include program instructions or code that may be executed by the processor 302 to perform various operations. In various embodiments, such program modules include, but are not limited to, the multi-intent search module 328, which causes the processor 302 to perform operations that result in the execution of the multi-intent search techniques provided herein, as described with respect to the method 200 of FIG. 2, for example.

It is to be understood that the block diagram of FIG. 3 is not intended to indicate that the computing system 300 is to include all of the components shown in FIG. 3. Rather, the computing system 300 can include fewer or additional components not illustrated in FIG. 3 (e.g., additional applications, additional modules, additional memory devices, additional network interfaces, etc.). Furthermore, any of the functionalities of the one or more program modules/sub-modules may be partially, or entirely, implemented in hardware and/or in the processor 302. For example, the functionality may be implemented with an application specific integrated circuit, in logic implemented in the processor 302, or in any other device.

Figure 4:
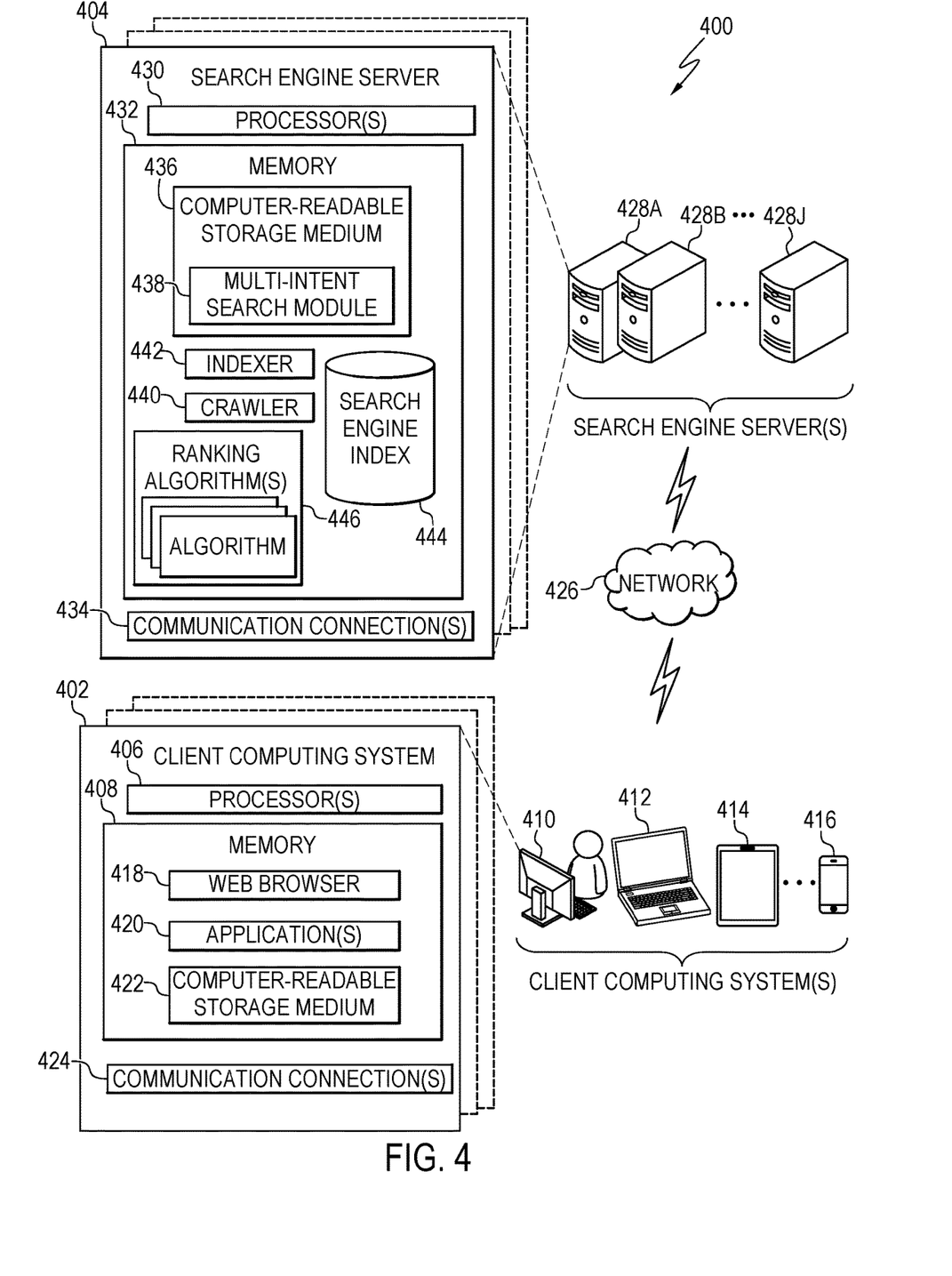
FIG. 4 is a block diagram of an exemplary network environment for implementing the multi-intent search techniques described herein.

FIG. 4 is a block diagram of an exemplary network environment 400 for implementing the multi-intent search techniques described herein. As shown in FIG. 4, the network environment 400 includes one or more client computing systems 402 and one or more search engine servers 404. Each client computing system 402 includes one or more processors 406 and memory 408 communicably coupled to the processor(s) 406. Each client computing system 402 may be implemented as any type of computing system, including (but not limited to) a personal computer, a laptop computer, a tablet computer, a portable digital assistant (PDA), a mobile phone (e.g., a smart phone), an electronic book (e-book) reader, a game console, a set-top box (STB), a smart television (TV), a portable game player, a portable media player, and so forth. FIG. 2 shows representative client computing systems in the forms of a desktop computer 410, a laptop computer 412, a tablet 414, and a mobile device 416. However, there are merely examples, and the client computing system(s) 402 described herein may take many other forms.

Each client computing system 402 may include a web browser 418, one or more applications 420, and one or more computer-readable storage media 422 stored in the memory 408, as described with respect to the computing system 300 of FIG. 3, for example. Each client computing system 402 may also include a communication connection 424 by which the client computing system 402 is able to communicate with other devices over a network 426. Moreover, the web browser 418 may be usable to access a search engine provided by the search engine server(s) 404, as well as to access other sites (e.g., e-commerce merchants, content providers, social networking sites, and the like) via the communication connection 424 over the network 426. In particular, in various embodiments, web browser 418 is used to access a search engine website, this allowing for the surfacing of a search engine UI by which a user can enter a search query without navigating to a particular website, as described herein.

The search engine described herein may be implemented or hosted by the search engine server(s) 404, which may be provided as one or more server farms or data centers, for example. In the embodiment shown in FIG. 4, the search engine is implemented by multiple servers 428A-J, for example. Moreover, it should be noted that the search engine components shown in FIG. 4 may each be implemented within any or all of the multiple search engine servers, depending on the details of the particular implementation. Specifically, the search engine server(s) 404 include one or more processors 430 communicably coupled to memory 432. The memory 432 may include one or more multiple memory devices, depending on the details of the particular implementation. The search engine server(s) 404 also include one or more communication connections 434 by which the search engine described herein may be implemented or hosted on the client computing system(s) via the network 426.

The memory 432 may include one or more computer-readable storage media 436. The computer-readable storage media 436 may include the multi-intent search module 438 described herein (as some portion thereof), which includes computer-executable instructions that cause the processor(s) 430 and/or the processor(s) 406 to implement the multi-intent search techniques described herein. The memory 432 also includes typical search engine components, including a crawler 440, an indexer 442, a search engine index 444, and ranking algorithms 446, all of which work together to enable the search engine to return relevant search results for particular search queries, as will be readily understood by those skilled in the art.

It is to be understood that the simplified block diagram of FIG. 4 is not intended to indicate that the network environment 400 is to include all of the components shown in FIG. 4. Rather, the network environment 400 may include different components and/or additional components not illustrated in FIG. 4.

Figure 5:
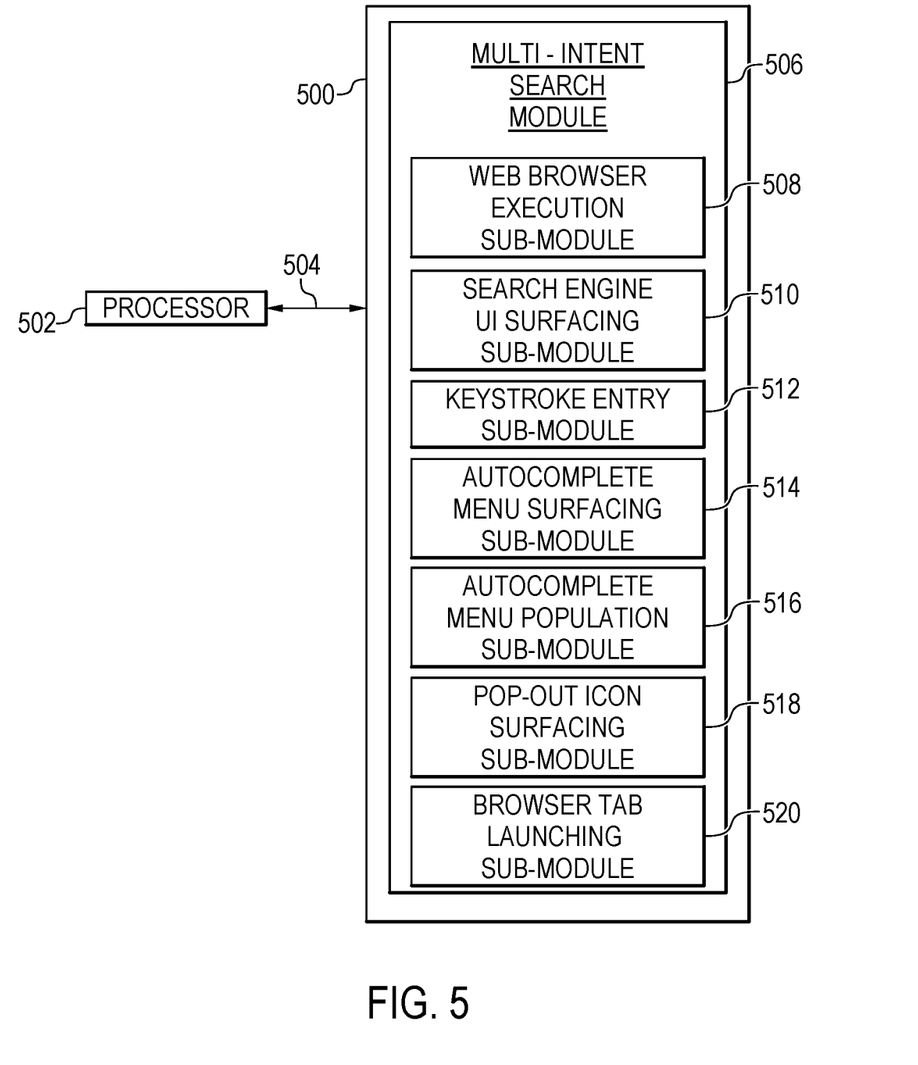
FIG. 5 is a block diagram of an exemplary computer-readable storage medium for implementing the multi-intent search techniques described herein.

FIG. 5 is a block diagram of an exemplary computer-readable storage medium 500 for implementing the multi-intent search techniques described herein. In various embodiments, the computer-readable storage medium 500 is accessed by a processor 502 over a computer interconnect 504. For example, in some embodiments, the computer-readable storage medium 500 is the same as, or similar to, the computer-readable storage medium described with respect to the computing system 300 of FIG. 3 and/or the network environment 400 of FIG. 4.

In various embodiments, the computer-readable storage medium 500 includes code (i.e., computer-executable instructions) to direct the processor 502 to perform the operations of the present techniques. Such code may be stored within the computer-readable storage medium 500 in the form of program modules, where each module includes a set of computer-executable instructions that, when executed by the processor 502, cause the processor 502 to perform a corresponding set of operations. In particular, in various embodiments, the computer-readable storage medium 500 includes a multi-intent search module 506 that directs the processor 502 to perform the multi-intent search techniques described herein. Moreover, in various embodiments, the multi-intent search module 506 accomplishes this via one or more sub-modules. Such sub-modules may include (but are not limited to) a web browser execution sub-module 508, a search engine UI surfacing sub-module 510, a keystroke entry sub-module 512, an autocomplete menu surfacing sub-module 514, an autocomplete menu population sub-module 516, a pop-out icon surfacing sub-module 518, and/or a browser tab launching sub-module 520. Such sub-module may be used to execute the exemplary method 200 described with respect to FIG. 2, for example.

Moreover, those skilled in the art will appreciate that any suitable number of the modules shown in FIG. 5 may be included within the computer-readable storage medium 500. Furthermore, any number of additional modules/sub-modules not shown in FIG. 5 may be included within the computer-readable storage medium 500, depending on the details of the specific implementation.

The present techniques may be susceptible to various modifications and alternative forms, including (but not limited to) those described in the following examples:

Example 1 is a method for multi-intent searching. The method is implemented in a computing system including a processor. The method includes: executing, via a network, a web browser, where the web browser is surfaced on a display of the computing system; surfacing, via the web browser, a search engine user interface (UI) in a first browser tab, where the search engine UI includes a search box for specifying a search query; responsive to first user input, entering keystrokes into the search box; surfacing an autocomplete menu adjacent to the search box; populating the autocomplete menu with suggested search queries related to the entered keystrokes; surfacing a pop-out icon corresponding to each suggested search query within the autocomplete menu; and responsive to second user input including a selection of the pop-out icon corresponding to one of the suggested search queries, launching a second browser tab including search results for the suggested search query; where the autocomplete menu with the suggested search queries is maintained within the first browser tab after the launching of the second browser tab.

Example 2 includes the method of example 1, including or excluding optional features. In this example, the method includes providing the suggested search queries as a list of suggested keyword strings.

Example 3 includes the method of example 1, including or excluding optional features. In this example, the method includes providing the suggested search queries as a number of different types of autocomplete UI elements, where at least a portion of the autocomplete UI elements include corresponding pop-out icons, as well as surfacing the autocomplete menu in an expanded format including at least one of multiple columns or multiple rows of the number of different types of autocomplete UI elements.

Example 4 includes the method of example 3, including or excluding optional features. In this example, the number of different types of autocomplete UI elements include at least two of: suggested keyword strings; suggested clickable image elements; suggested frequently-asked questions; or suggested clickable buttons.

Example 5 includes the method of any one of examples 1 to 4, including or excluding optional features. In this example, the method includes, responsive to third user input including a selection of the pop-out icon corresponding to another one of the suggested search queries, launching a third browser tab including second search results for the another one of the suggested search queries; where the autocomplete menu with the suggested search queries is maintained within the first browser tab and the search results for the suggested search query are maintained in the second browser tab after the launching of the third browser tab.

Example 6 includes the method of any one of examples 1 to 5, including or excluding optional features. In this example, the method includes performing the method via a web-based search engine application or a mobile search engine application executing on the computing system.

Example 7 includes the method of any one of examples 1 to 6, including or excluding optional features. In this example, the method includes providing a portion of the suggested search queries with an embedded pop-out functionality rather than a corresponding pop-out icon.

Example 8 is search engine server. The search engine server includes a processor; a communication connection for connecting a remote computing system to the search engine server via a network; and a computer-readable storage medium operatively coupled to the processor, the computer-readable storage medium including computer-executable instructions that, when executed by the processor, cause the processor to: surface, via a web browser provided through the network, a search engine user interface (UI) in a first browser tab, where the search engine UI includes a search box for specifying a search query, and where the search engine UI is surfaced on a display of the remote computing system; responsive to first user input received via the remote computing system, enter keystrokes into the search box; surface, via the display of the remote computing system, an autocomplete menu adjacent to the search box; populate the autocomplete menu with suggested search queries related to the entered keystrokes; surface, via the display of the remote computing system, a pop-out icon corresponding to each suggested search query within the autocomplete menu; and responsive to second user input including a selection of the pop-out icon corresponding to one of the suggested search queries, launch a second browser tab including search results for the suggested search query, where the second browser tab is launched on the display of the remote computing system; where the autocomplete menu with the suggested search queries is maintained within the first browser tab after the launching of the second browser tab.

Example 9 includes the search engine server of example 8, including or excluding optional features. In this example, the computer-executable instructions, when executed by the processor, cause the processor to provide the suggested search queries as a list of suggested keyword strings.

Example 10 includes the search engine server of example 8, including or excluding optional features. In this example, the computer-executable instructions, when executed by the processor, cause the processor to: provide the suggested search queries as a number of autocomplete UI elements, where at least a portion of the number of different types of autocomplete UI elements include corresponding pop-out icons; and surface the autocomplete menu in an expanded format including at least one of multiple columns or multiple rows of the autocomplete UI elements.

Example 11 includes the search engine server of example 10, including or excluding optional features. In this example, the number of different types of autocomplete UI elements include at least two of: suggested keyword strings; suggested clickable image elements; suggested frequently-asked questions; or suggested clickable buttons.

Example 12 includes the search engine server of any one of examples 8 to 11, including or excluding optional features. In this example, the computer-executable instructions, when executed by the processor, cause the processor to, responsive to third user input including a selection of the pop-out icon corresponding to another one of the suggested search queries, launch a third browser tab including second search results for the another one of the suggested search queries; where the autocomplete menu with the suggested search queries is maintained within the first browser tab and the search results for the suggested search query are maintained in the second browser tab after the launching of the third browser tab.

Example 13 includes the search engine server of any one of examples 8 to 12, including or excluding optional features. In this example, the computer-executable instructions, when executed by the processor, cause the processor to surface the search engine UI in the first browser tab via a web-based search engine application or a mobile search engine application.

Example 14 includes the search engine server of any one of examples 8 to 13, including or excluding optional features. In this example, the computer-executable instructions, when executed by the processor, cause the processor to provide a portion of the suggested search queries with an embedded pop-out functionality rather than a corresponding pop-out icon.

Example 15 is a computer-readable storage medium. The computer-readable storage medium includes computer-executable instructions that, when executed by a processor, cause the processor to: surface, via a web browser provided through the network, a search engine user interface (UI) in a first browser tab, where the search engine UI includes a search box for specifying a search query, and where the search engine UI is surfaced on a display of the remote computing system; responsive to first user input received via the remote computing system, enter keystrokes into the search box; surface, via the display of the remote computing system, an autocomplete menu adjacent to the search box; populate the autocomplete menu with suggested search queries related to the entered keystrokes; surface, via the display of the remote computing system, a pop-out icon corresponding to each suggested search query within the autocomplete menu; and responsive to second user input including a selection of the pop-out icon corresponding to one of the suggested search queries, launch a second browser tab including search results for the suggested search query, where the second browser tab is launched on the display of the remote computing system; where the autocomplete menu with the suggested search queries is maintained within the first browser tab after the launching of the second browser tab.

Example 16 includes the computer-readable storage medium of example including or excluding optional features. In this example, the computer-executable instructions, when executed by the processor, cause the processor to provide the suggested search queries as a list of suggested keyword strings.

Example 17 includes the computer-readable storage medium of example including or excluding optional features. In this example, the computer-executable instructions, when executed by the processor, cause the processor to: provide the suggested search queries as a number of different types of autocomplete UI elements, where at least a portion of the autocomplete UI elements include corresponding pop-out icons; and surface the autocomplete menu in an expanded format including at least one of multiple columns or multiple rows of the number of different types of autocomplete UI elements.

Example 18 includes the computer-readable storage medium of example 17, including or excluding optional features. In this example, the number of different types of autocomplete UI elements include at least two of: suggested keyword strings; suggested clickable image elements; suggested frequently-asked questions; or suggested clickable buttons.

Example 19 includes the computer-readable storage medium of any one of examples 15 to 18, including or excluding optional features. In this example, the computer-executable instructions, when executed by the processor, cause the processor to, responsive to third user input including a selection of the pop-out icon corresponding to another one of the suggested search queries, launch a third browser tab including second search results for the another one of the suggested search queries; where the autocomplete menu with the suggested search queries is maintained within the first browser tab and the search results for the suggested search query are maintained in the second browser tab after the launching of the third browser tab.

Example 20 includes the computer-readable storage medium of any one of examples 15 to 19, including or excluding optional features. In this example, the computer-executable instructions, when executed by the processor, cause the processor to provide a portion of the suggested search queries with an embedded pop-out functionality rather than a corresponding pop-out icon.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (Sot's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process. However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for multi-intent searching, wherein the method is implemented via a computing system comprising a processor, and wherein the method comprises:
    executing, via a network, a web browser, wherein the web browser is surfaced on a display of the computing system;
    surfacing, via the web browser, a search engine user interface (UI) of a search engine, wherein the search engine UI comprises a search box for specifying a search query;
    responsive to first user input, entering keystrokes into the search box;
    surfacing an autocomplete menu adjacent to the search box in an existing browser tab;
    populating the autocomplete menu with suggested search queries related to the entered keystrokes;
    surfacing individual pop-out icons within the autocomplete menu of the existing browser tab, the individual pop-out icons indicating different suggested search queries within the suggested search queries;
    responsive to a user selecting a first pop-out icon within the autocomplete menu of the existing browser tab, launching a first new browser tab indicating search results corresponding to the first pop-out icon, wherein the autocomplete menu is maintained within the existing browser tab after launching the first new browser tab; and
    responsive to the user selecting a second pop-out icon within the autocomplete menu being maintained within the existing browser tab, launching a second new browser tab indicating search results corresponding to the second pop-out icon, wherein the autocomplete menu continues to be maintained within the existing browser tab after launching of the second new browser tab.

2. The method of claim 1, comprising providing the suggested search queries as a list of suggested keyword strings.

3. The method of claim 1, further comprising:
    providing the suggested search queries as a plurality of different types of autocomplete UI elements, wherein at least a portion of the autocomplete UI elements comprise corresponding pop-out icons; and
    surfacing the autocomplete menu in an expanded format comprising at least one of multiple columns or multiple rows of the plurality of different types of autocomplete UI elements.

4. The method of claim 3, wherein the plurality of different types of autocomplete UI elements comprise at least two of:
    suggested keyword strings;
    suggested clickable image elements;
    suggested frequently-asked questions; or
    suggested clickable buttons.

19

5. The method of claim 1, wherein the autocomplete menu is provided as part of a web-based search engine application or a mobile search engine application.

6. The method of claim 1, wherein the search engine itself initiates launching of the first new browser tab and the second new browser tab.

7. A search engine server comprising:
a processor; and
a computer-readable storage medium operatively coupled to the processor, the computer-readable storage medium storing computer-executable instructions that, when executed by the processor, cause the processor to:
execute, via a network, a web browser, wherein the web browser is surfaced on a display of a computing system;
surface, via the web browser, a search engine user interface (UI) of a search engine, wherein the search engine UI comprises a search box for specifying a search query;
responsive to first user input, enter keystrokes into the search box;
surface an autocomplete menu adjacent to the search box in an existing browser tab;
populate the autocomplete menu with suggested search queries related to the entered keystrokes;
surface individual pop-out icons within the autocomplete menu of the existing browser tab, the individual pop-out icons indicating different suggested search queries within the suggested search queries;
responsive to a user selecting a first pop-out icon within the autocomplete menu of the existing browser tab, launch a first new browser tab indicating search results corresponding to the first pop-out icon, wherein the autocomplete menu is maintained within the existing browser tab after launching the first new browser tab; and
responsive to the user selecting a second pop-out icon within the autocomplete menu being maintained within the existing browser tab, launch a second new browser tab indicating search results corresponding to the second pop-out icon, wherein the autocomplete menu continues to be maintained within the existing browser tab after launching of the second new browser tab.

8. The search engine server of claim 7, comprising providing the suggested search queries as a list of suggested keyword strings.

9. The search engine server of claim 7, comprising:
providing the suggested search queries as a plurality of different types of autocomplete UI elements, wherein at least a portion of the autocomplete UI elements comprise corresponding pop-out icons; and
surfacing the autocomplete menu in an expanded format comprising at least one of multiple columns or multiple rows of the plurality of different types of autocomplete UI elements.

10. The search engine server of claim 9, wherein the plurality of different types of autocomplete UI elements comprise at least two of:
suggested keyword strings;
suggested clickable image elements;
suggested frequently-asked questions; or
suggested clickable buttons.

11. The search engine server of claim 7, wherein the autocomplete menu is provided as part of a web-based search engine application or a mobile search engine application.

20

12. The search engine server of claim 7, wherein the search engine itself initiates launching of the first new browser tab and the second new browser tab.

13. A computer-readable storage medium comprising computer-executable instructions that, when executed by a processor, cause the processor to:
execute, via a network, a web browser, wherein the web browser is surfaced on a display of a computing system;
surface, via the web browser, a search engine user interface (UI) of a search engine, wherein the search engine UI comprises a search box for specifying a search query;
responsive to first user input, enter keystrokes into the search box;
surface an autocomplete menu adjacent to the search box in an existing browser tab;
populate the autocomplete menu with suggested search queries related to the entered keystrokes;
surface individual pop-out icons within the autocomplete menu of the existing browser tab, the individual pop-out icons indicating different suggested search queries within the suggested search queries;
responsive to a user selecting a first pop-out icon within the autocomplete menu of the existing browser tab, launch a first new browser tab indicating search results corresponding to the first pop-out icon, wherein the autocomplete menu is maintained within the existing browser tab after launching the first new browser tab; and
responsive to the user selecting a second pop-out icon within the autocomplete menu being maintained within the existing browser tab, launch a second new browser tab indicating search results corresponding to the second pop-out icon, wherein the autocomplete menu continues to be maintained within the existing browser tab after launching of the second new browser tab.

14. The computer-readable storage medium of claim 13, comprising providing the suggested search queries as a list of suggested keyword strings.

15. The computer-readable storage medium of claim 13, further comprising:
providing the suggested search queries as a plurality of different types of autocomplete UI elements, wherein at least a portion of the autocomplete UI elements comprise corresponding pop-out icons; and
surfacing the autocomplete menu in an expanded format comprising at least one of multiple columns or multiple rows of the plurality of different types of autocomplete UI elements.

16. The computer-readable storage medium of claim 15, wherein the plurality of different types of autocomplete UI elements comprise at least two of:
suggested keyword strings;
suggested clickable image elements;
suggested frequently-asked questions; or
suggested clickable buttons.

17. The computer-readable storage medium of claim 13, wherein the autocomplete menu is provided as part of a web-based search engine application or a mobile search engine application.

18. The computer-readable storage medium of claim 13, wherein the search engine itself initiates launching of the first new browser tab and the second new browser tab.

* * * * *